United States Patent
Pfeifle

(10) Patent No.: US 9,235,598 B2
(45) Date of Patent: Jan. 12, 2016

(54) LOCATION BASED FULL TEXT SEARCH

(71) Applicant: Navteq B.V., Veldhoven (NL)

(72) Inventor: Martin Pfeifle, Seewald (DE)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/275,266

(22) Filed: May 12, 2014

(65) Prior Publication Data

US 2014/0250141 A1 Sep. 4, 2014

Related U.S. Application Data

(63) Continuation of application No. 13/301,998, filed on Nov. 22, 2011, now Pat. No. 8,738,595.

(51) Int. Cl.
*G06F 17/30* (2006.01)

(52) U.S. Cl.
CPC ...... *G06F 17/30241* (2013.01); *G06F 17/3066* (2013.01); *G06F 17/30324* (2013.01); *G06F 17/30619* (2013.01)

(58) Field of Classification Search
USPC .................................. 707/706, 711, 724, 745
See application file for complete search history.

(56) References Cited

U.S. PATENT DOCUMENTS

| | | | |
|---|---|---|---|
| 5,710,915 A | 1/1998 | McElhiney | |
| 5,852,821 A | 12/1998 | Chen et al. | |
| 6,035,298 A * | 3/2000 | McKearney | G06F 17/30595 1/1 |
| 6,670,920 B1 * | 12/2003 | Herrick | 342/378 |
| 6,778,981 B2 | 8/2004 | Lee et al. | |
| 6,868,410 B2 | 3/2005 | Fortin et al. | |
| 7,231,388 B2 | 6/2007 | Matsubayashi et al. | |
| 7,298,327 B2 * | 11/2007 | Dupray et al. | 342/451 |
| 7,305,382 B2 | 12/2007 | Kobayashi | |
| 7,426,507 B1 | 9/2008 | Patterson | |
| 7,707,139 B2 | 4/2010 | Okamoto et al. | |
| 8,046,347 B2 | 10/2011 | Joshi | |
| 8,150,823 B2 | 4/2012 | Hamano et al. | |
| 8,214,387 B2 | 7/2012 | King et al. | |
| 8,407,216 B2 | 3/2013 | Walker et al. | |
| 8,489,624 B2 | 7/2013 | King et al. | |
| 8,554,786 B2 | 10/2013 | Yano et al. | |
| 8,972,467 B2 * | 3/2015 | Heinrich | H04L 67/1095 345/661 |
| 2002/0188581 A1 | 12/2002 | Fortin et al. | |
| 2003/0097356 A1 | 5/2003 | Lee et al. | |

(Continued)

FOREIGN PATENT DOCUMENTS

EP 2306333 4/2011
WO WO2008005809 1/2008

OTHER PUBLICATIONS

Anonymous, Z-Order Curve, Apr. 1, 2011, http://en.wikipedia.ord/wiki/Z-order_curve.

(Continued)

*Primary Examiner* — Hanh Thai
(74) *Attorney, Agent, or Firm* — Lempia Summerfield Katz LLC

(57) ABSTRACT

A method and system for a location based full text search is disclosed. The system generates interwoven bit vectors for documents that are stored in a database. The system may determine a location value based on a portion of a map that a user is viewing. The system may also receive at least one search term inputted by a user. Based on the location value and the search term, the system may generate one or more interwoven bit vectors, which may be used to query an index that identifies responsive documents stored in the database.

20 Claims, 10 Drawing Sheets

(56) References Cited

U.S. PATENT DOCUMENTS

| | | |
|---|---|---|
| 2004/0215641 A1 | 10/2004 | Kothuri et al. |
| 2005/0187916 A1 | 8/2005 | Levin et al. |
| 2005/0228860 A1* | 10/2005 | Hamynen ......... G06F 17/30241 709/203 |
| 2007/0091609 A1* | 4/2007 | Solberg et al. ................ 362/287 |
| 2007/0106500 A1 | 5/2007 | Loofbourrow et al. |
| 2008/0016066 A1 | 1/2008 | Kuznetsov et al. |
| 2008/0040384 A1 | 2/2008 | Kuznetsov |
| 2008/0059462 A1 | 3/2008 | Millett et al. |
| 2008/0113672 A1* | 5/2008 | Karr et al. .................. 455/456.1 |
| 2010/0010977 A1 | 1/2010 | Choi et al. |
| 2010/0042273 A1* | 2/2010 | Meunier et al. .................... 701/9 |
| 2010/0049765 A1* | 2/2010 | Asher et al. .................... 707/723 |
| 2010/0077001 A1 | 3/2010 | Vogel et al. |
| 2010/0169361 A1 | 7/2010 | Chen et al. |
| 2010/0205175 A1 | 8/2010 | Dole |
| 2010/0217753 A1 | 8/2010 | Shlomot et al. |
| 2010/0306227 A1 | 12/2010 | Fleming et al. |
| 2010/0325011 A1 | 12/2010 | Foster et al. |
| 2011/0004599 A1* | 1/2011 | Deninger et al. ............. 707/747 |
| 2011/0044599 A1 | 2/2011 | Kowalczyk et al. |
| 2011/0113064 A1 | 5/2011 | Govindachetty et al. |
| 2011/0196602 A1 | 8/2011 | Pfeifle et al. |
| 2012/0158696 A1 | 6/2012 | Arasu et al. |
| 2013/0159320 A1 | 6/2013 | Gao et al. |

OTHER PUBLICATIONS

Hearst et al., Tilebars: Visualization of Term Distribution Information in Full Text Information Access, May 7-11, 1995, pp. 59-66, Human Factors in Computing Systems, '95 Conference Proceedings, Denver, CO.

International Search Report and Written Opinion for PCT/EP2012/072544, Mailed Apr. 10, 2013.

International Search Report and Written Opinion for PCT/EP2012/072545, mailed Mar. 13, 2013.

International Search Report and Written Opinion for PCT/EP2013/056454, mailed May 7, 2013.

Oosterom et al., Spatial Location Code, Aug. 12, 1996, www.gdmc.nl/oosterom/slc.pdf.

Shi Lei et al., Building a Protein Name Dictionary from Full Text: A Machine Learning Term Extraction Approach, Apr. 7, 2005, vol. 6, No. 1, BMC Bioinformatics, Biomed Central, London, GB.

Zhou et al., Hybrid Index Structures for Location-Based Web Search, Oct. 2005, pp. 2-8.

* cited by examiner (45, 87) = (0100 0101, 1000 0111)

= (01100000 00110111)

= (6037)

POI1 LATITUDE = 11101100 10101101 11000100 01100111
POI1 LONGITUDE = 11100011 01111010 11000101 11001000

POI1 MORTON CODE = 11111100 10100101 10011101 11100110
                   11110000 00110001 01111000 01101010

NAVTEQ = 01001110 01000001 01010110 01010100
         01000101 01010001 00000000 00000000

INTERWOVEN  = 1101110011110010 1001100001000101
BIT VECTOR    1001010111010110 1101100101011000
              1101110000010001 0001110100000101
              0100110010000000 0100100010001000

FIG. 8

MORTON CODE = 11111100 10100101 10011101

"NAV" = 01001110 01000001 01010110

INTERWOVEN = 1101110011110010 1001100001000101
BIT VECTOR    100101011010110

UPPER-BOUND = 1101110011110010 1001100001000101
BIT VECTOR    100101011010110 1111111111111111
              1111111111111111 1111111111111111
              1111111111111111 1111111111111111

LOWER-BOUND = 1101110011110010 1001100001000101
BIT VECTOR    100101011010110 0000000000000000
              0000000000000000 0000000000000000
              0000000000000000 0000000000000000

FIG. 11A

MORTON CODE = 11111100 10100101 10011101

"NA" = 01001110 01000001 00000000

INTERWOVEN = 1101110011110010 1001100001000101
BIT VECTOR    1000010011000100

UPPER-BOUND = 1101110011110010 1001100001000101
BIT VECTOR    1011011111110111 1111111111111111
              1111111111111111 1111111111111111
              1111111111111111 1111111111111111

LOWER-BOUND = 1101110011110010 1001100001000101
BIT VECTOR    1000010011000100 0000000000000000
              0000000000000000 0000000000000000
              0000000000000000 0000000000000000

FIG. 11B

MORTON CODE = 11111100 10100101 10011101
              00000000 00000000 00000000

"NAVTEQ"     = 01001110 01000001 01010110
               01010100 01000101 01010001

INTERWOVEN   = 1101110011110010 1001100001000101
BIT VECTOR     1001010111010110 0001000100010000
               0001000000010001 0001000100000001

UPPER-BOUND  = 1101110011110010 1001100001000101
BIT VECTOR     1001010111010110 1101110111011100
               1101110011011101 1101110111001101
               1111111111111111 1111111111111111

LOWER-BOUND  = 1101110011110010 1001100001000101
BIT VECTOR     1001010111010110 0001000100010000
               0001000000010001 0001000100000001
               0000000000000000 0000000000000000

FIG. 11C

LOCATION BASED FULL TEXT SEARCH

This application is a continuation under 37 C.F.R. §1.53(b) and 35 U.S.C. §120 of U.S. patent application Ser. No. 13/301,998 filed Nov. 22, 2011, which in incorporated by reference in its entirety.

REFERENCE TO RELATED APPLICATIONS

The present patent application is related to the copending patent applications filed on the same date, Ser. No. 13/301,994, entitled "FULL TEXT SEARCH BASED ON INTERWOVEN STRING TOKENS," and Ser. No. 13/302,000, entitled "FULL TEXT SEARCH USING R-TREES."

FIELD

The present invention relates generally to location based full text search, and more particularly, relates to location based full text search using interwoven location and data values.

BACKGROUND

Full text search (FTS) systems search for relevant documents based on key words entered by a system user. The user enters a set of terms, referred to as tokens, and the FTS system retrieves documents containing all of the terms in the set. For example, Lucene (described at http://lucene.apache.org/) and SQLite's FTS module (described at http://www.sqlite.org/cvstrac/wiki?p=FtsUsage) are both FTS systems.

Often a user wants to combine FTS with a spatial search. For instance, a web-based mapping application may allow a user to zoom into a certain region of a map and then enter one or more search terms, such as "restaurant" or "hotel." The web-based mapping application may then overlay push-pin icons over the map identifying where restaurants or hotels are located in the displayed region.

Generally, there are three approaches to execute a location based full text search. First, a spatial search may be conducted to return all points of interest within a geographic area. A full text search may then be conducted on the set of returned points of interest using one or more entered search tokens. This approach may be efficient if the spatial search is somewhat selective (i.e., a relatively small geographic area). Second, a full text search may be conducted first followed by a spatial search conducted upon the returned list of full text search results. This approach may be efficient if the full text search is somewhat selective. Third, a full text search and a spatial search may be conducted in parallel and the intersection of the two result sets may constitute the result set. This approach may be efficient if both searches are rather selective.

However, when the spatial search and the full text search are both rather unselective, none of these three approaches are particularly efficient. One example in which the spatial search and the full text search are both rather unselective is if a user conducted a search for "Pizza" within Chicago, Ill. Thus, it would be beneficial to have a location based full text search system that works efficiently when the single search criteria are unselective but the combination of them is selective.

SUMMARY

A method and system for performing a location based full text search that increases search query speed is described. According to one example, a system generates interwoven bit vectors for documents that are stored in a database. An interwoven bit vector may be the combination of a data value associated with a search term and a location value. The location value may be based on a portion of a map that a user is viewing. Executing a search using an interwoven bit vector may be faster and more efficient than separately executing a search using the underlying data token and/or the underlying location value.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 8 depicts generation of an interwoven bit vector, according to an example;

FIGS. 11A, 11B, and 11C depict generation of interwoven bit vectors, according to some examples.

DETAILED DESCRIPTION

The method and system for performing location based full text search as described herein may be performed on any computing platform, such as a navigation system, a server, a personal computer, a mobile telephone, and so on. A navigation system example is provided for purposes of explaining the details of the location based full text search system. However, it is understood that this is a non-limiting example.

I. Navigation System

Figure 1:
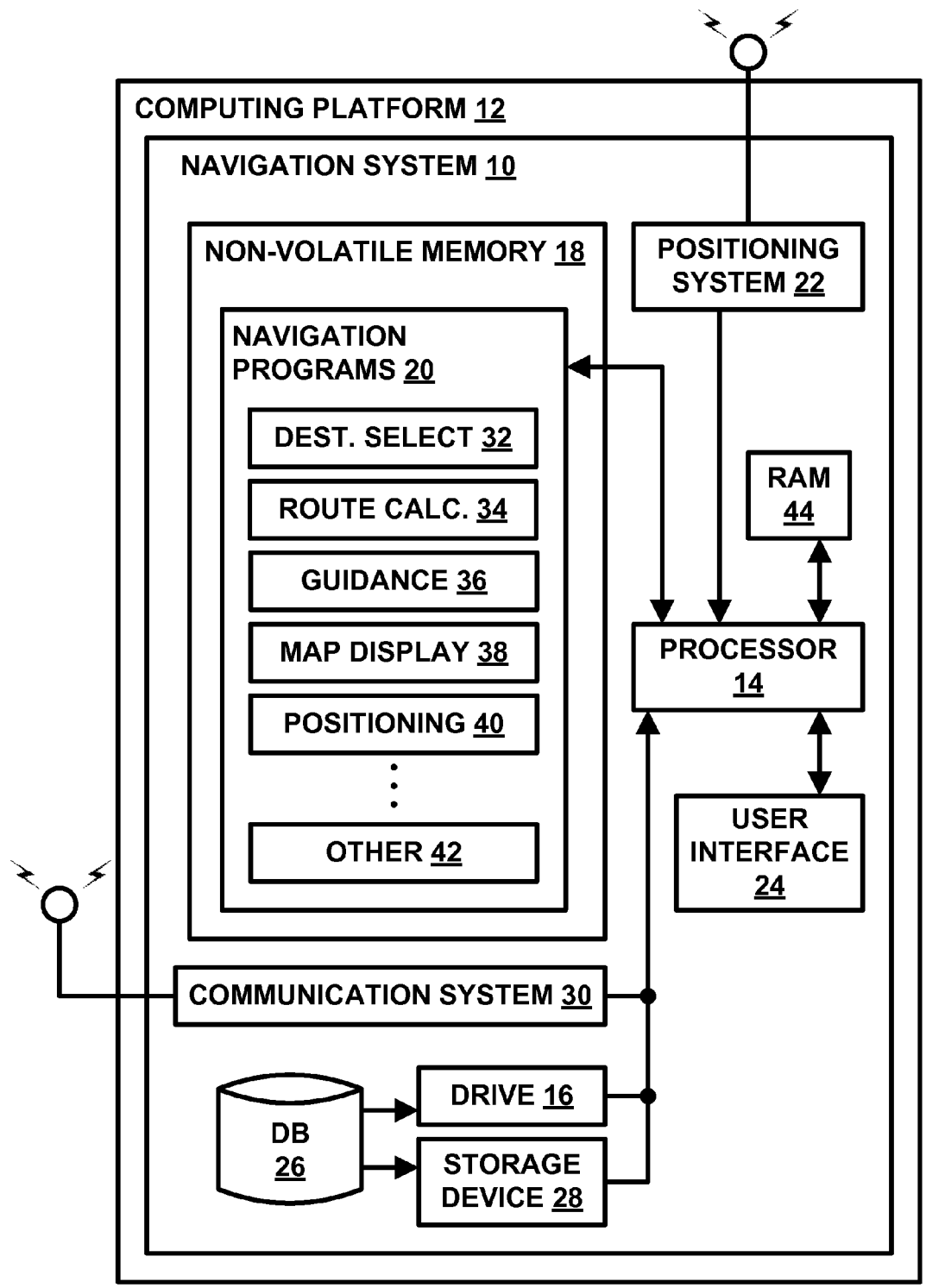
FIG. 1 is a block diagram depicting a navigation system, according to an example.

FIG. 1 is a block diagram of a navigation system 10 associated with a computing platform 12. The computing platform 12 may be associated with a vehicle. Additionally, the computing platform 12 may be a personal digital assistant (PDA), mobile telephone, personal computer, or any other computer. The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information.

The navigation system 10 also includes a positioning system 22. The positioning system 22 may utilize GPS-type technology, a dead reckoning-type system, or combinations of these or other systems, all of which are known in the art. The positioning system 22 may include suitable sensing devices that measure the traveling distance speed, direction, orientation, and so on. The positioning system 22 may also include a GPS system. The positioning system 22 outputs a signal to the processor 14. The navigation application software programs 20 that run on the processor 14 use the signal from the positioning system 22 to determine the location, direction, orientation, etc., of the computing platform 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26.

In one embodiment, the geographic database 26 is stored on a storage medium, such as a CD-ROM or DVD, that is installed in the drive 16 so that the geographic database 26 can be read and used by the navigation system 10. In one embodiment, the navigation system 10 also includes a storage device 28, such as a hard disk or memory card, on which a portion of the geographic database 26 is stored. In another embodiment, the geographic database 26 is stored on a hard disk. In one embodiment, the geographic database 26 may be a geographic database published by NAVTEQ North America, LLC of Chicago, Ill. The geographic database 26 does not have to be physically provided at the location of the navigation system 10. In alternative embodiments, some or the entire geographic database 26 may be located remotely from the rest of the navigation system 10 and portions of the geographic data provided via a communications system 30, as needed.

In one exemplary type of system, the navigation application software programs 20 load from the non-volatile memory storage device 18 into a random access memory (RAM) 44 associated with the processor 14. The processor 14 also receives input from the user interface 24. The navigation system 10 uses the geographic database 26 stored on the storage medium and/or storage device 28, possibly in conjunction with the outputs from the positioning system 22 and the communications system 30, to provide various navigation features and functions. The navigation application software programs 20 may include separate applications (or subprograms) that provide the various navigation-related features and functions. The navigation functions and features may include destination selection 32 (identifying one or more places to be used as a destination based on user input), route calculation 34 (determining a route from an origin to a destination), route guidance 36 (providing detailed directions for reaching a destination), map display 38, and positioning 40 (e.g., map matching). Other functions and programming 42 may be included in the navigation system 10.

The navigation application software programs 20 may be written in a suitable computer programming language such as C, although other programming languages, such as C++ or Java, are also suitable. All of the components described above may be conventional (or other than conventional) and the manufacture and use of these components are known to those of skill in the art.

II. Geographic Database

Figure 2:
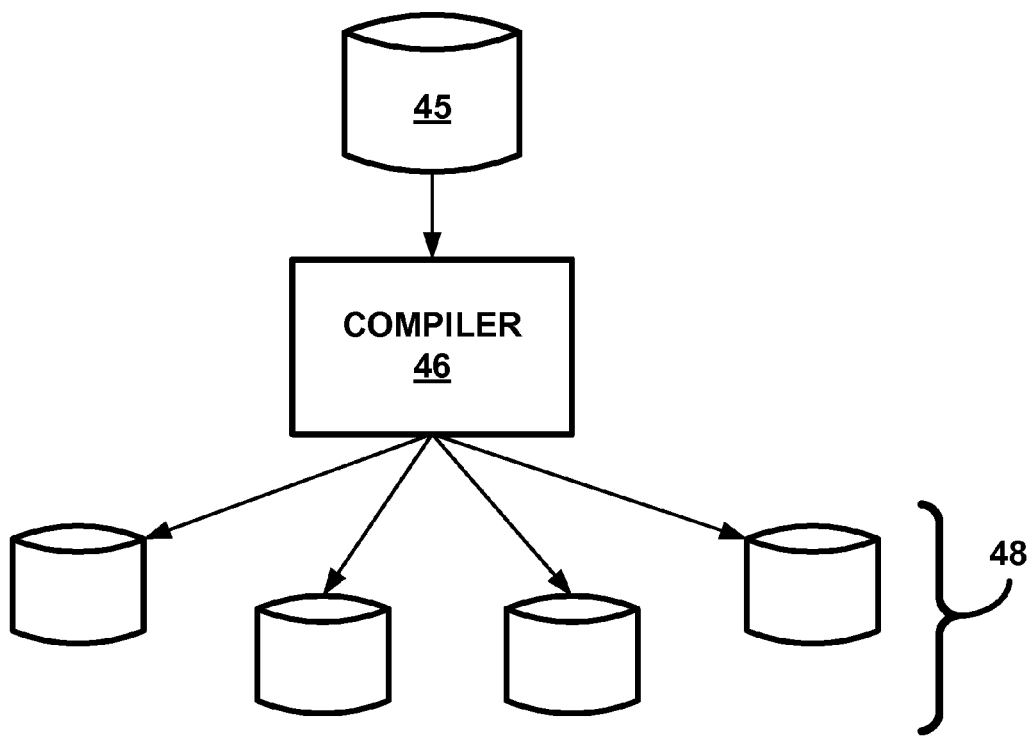
FIG. 2 is a block diagram that illustrates forming geographic database products from a master version of a geographic database; according to an example.

The geographic database 26 is a compiled database product, which is produced directly or indirectly from a master version of a geographic database. FIG. 2 shows a master version of a geographic database 45. The master version of the geographic database 45 contains data that represent geographic features in a coverage area. The coverage area may correspond to an entire country, such as the United States. Alternatively, the coverage area may correspond to several countries, such as the United States, Canada, and Mexico, or France, Germany, and Italy, and so on. According to another alternative, the coverage area of the master version of the geographic database 45 may represent only a single region within a country, such as the West Coast or the Midwest of the U.S. Although the master version of the geographic database 45 includes data that represent geographic features in the entire coverage area, there may be parts of the coverage area that contain geographic features that are not represented by data in the geographic database, or for which the representation of geographic features is sparse.

The master version of the geographic database 45 includes data about a road network located in the coverage area. The data about the road network include various kinds of information, such as the geographic coordinates of positions of the roads, street names of the roads, addresses ranges along the roads, turn restrictions at intersections of roads, and so on. The master version of the geographic database 45 also includes data about points of interest in the covered area. Points of interest may include hotels, restaurants, museums, stadiums, offices, automobile dealerships, auto repair shops, etc. The master version of the geographic database 45 may include data about the locations of these points of interests. The master version of the geographic database 45 may also include data about places, such as cities, towns, or other communities. The master version of the geographic database 45 may include other kinds of information.

The master version of the geographic database 45 is maintained as the copy that has the most up-to-date data relating to the coverage area. Accordingly, the master version of the geographic database 45 is updated, expanded, and/or otherwise modified on a regular and continuing basis. To facilitate these operations, the master version of the geographic database 45 is stored in a format that facilitates updating, maintenance, and development. For example, the data in the master version 45 may be uncompressed. Examples of suitable formats include Oracle Spatial and VSAM although other formats, both proprietary and non-proprietary, including GDF, may be suitable. In general, the format of the master database 45 is not suitable for use in systems that provide navigation functions, such as navigation systems.

The master version of the geographic database 45 is used to make compiled database products 48, one example of which is the geographic database 26 depicted in FIG. 1. In one method of operation, data from the master version of the geographic database 45 is first compiled into an intermediate or delivery format, such as GDF. Then, the database in the delivery format is used to make the compiled database products 48. The compiled database products 48 are made using a compiler 46. The compiler 46 is a software program run on an appropriate computer platform. The compiler 46 obtains geographic data from the intermediate format database (which was formed from the master geographic database 45) and organizes the data into a format (or formats) to produce the compiled (or working) version of the geographic databases 48. The format of the compiled geographic databases 48 facilitates use of the geographic data in the end users' systems for navigation-related purposes.

The compiled database products 48 may include only portions of all the data in the master version of the geographic database 45. For example, the compiled database products 48 may include data that relate to only one or more specific sub-areas within the coverage area of the master version of the geographic database 45. Further, the compiled database products 48 may include fewer than all the data attributes that describe geographic features represented in the master version of the geographic database 45.

The compiled database products 48 are used on various kinds of computing platforms. For example, the compiled database products 48 are used in navigation systems (such as in-vehicle navigation systems and hand-held portable navigation systems), personal computers (including desktop and notebook computers), and other kinds of devices, such as pagers, telephones, personal digital assistants, tablets, smartphones, etc. The compiled database products 48 are also used on networked computing platforms and environments, including systems connected to the Internet.

The compiled database products 48 are stored on media that are suitable for the hardware platforms on which they are used. For example, the compiled database products may be stored on CD-ROM disks, hard drives, DVD disks, flash memory, or other types of media that are available now or that become available in the future.

In the compiled databases 48, the geographic data are organized differently than in the master version of the geographic database 45. A compiled database is organized, arranged, structured and stored in a form that facilitates the use of the data in the computing platform in which it is installed. A compiled database 48 may also be stored in a compressed format on the media on which it is located. An example of how the road network is represented in a compiled database product 48 is provided with reference to FIGS. 3 and 4.

Figure 3:
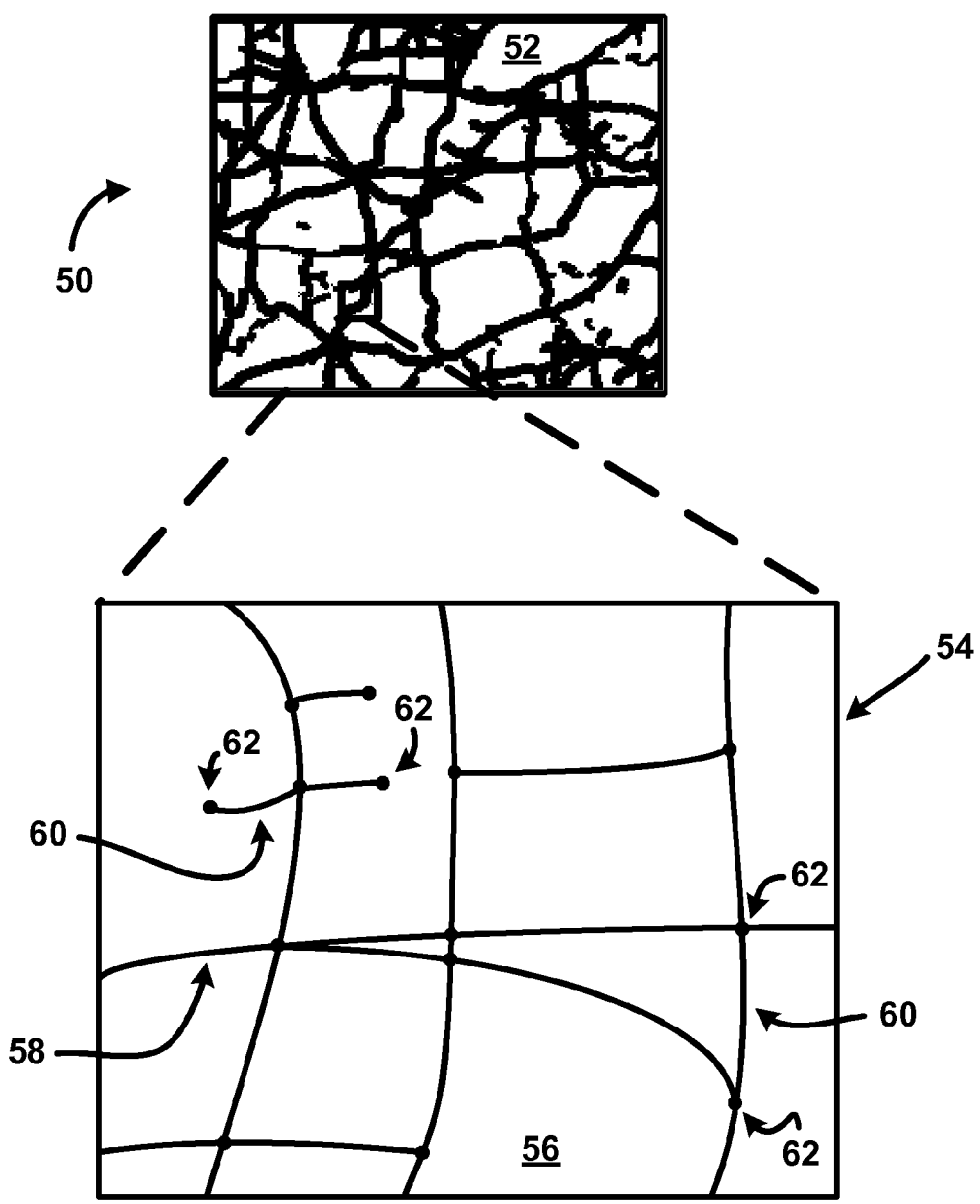
FIG. 3 depicts a map of a geographic region, according to an example.

FIG. 3 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 3 also includes an enlarged map 54 of a portion 56 of the geographic region 52. The enlarged map 54 illustrates part of the road network 58 in the geographic region 52. The road network 58 includes, among other things, roads and intersections located in the geographic region 52. As shown in the portion 56, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 4:
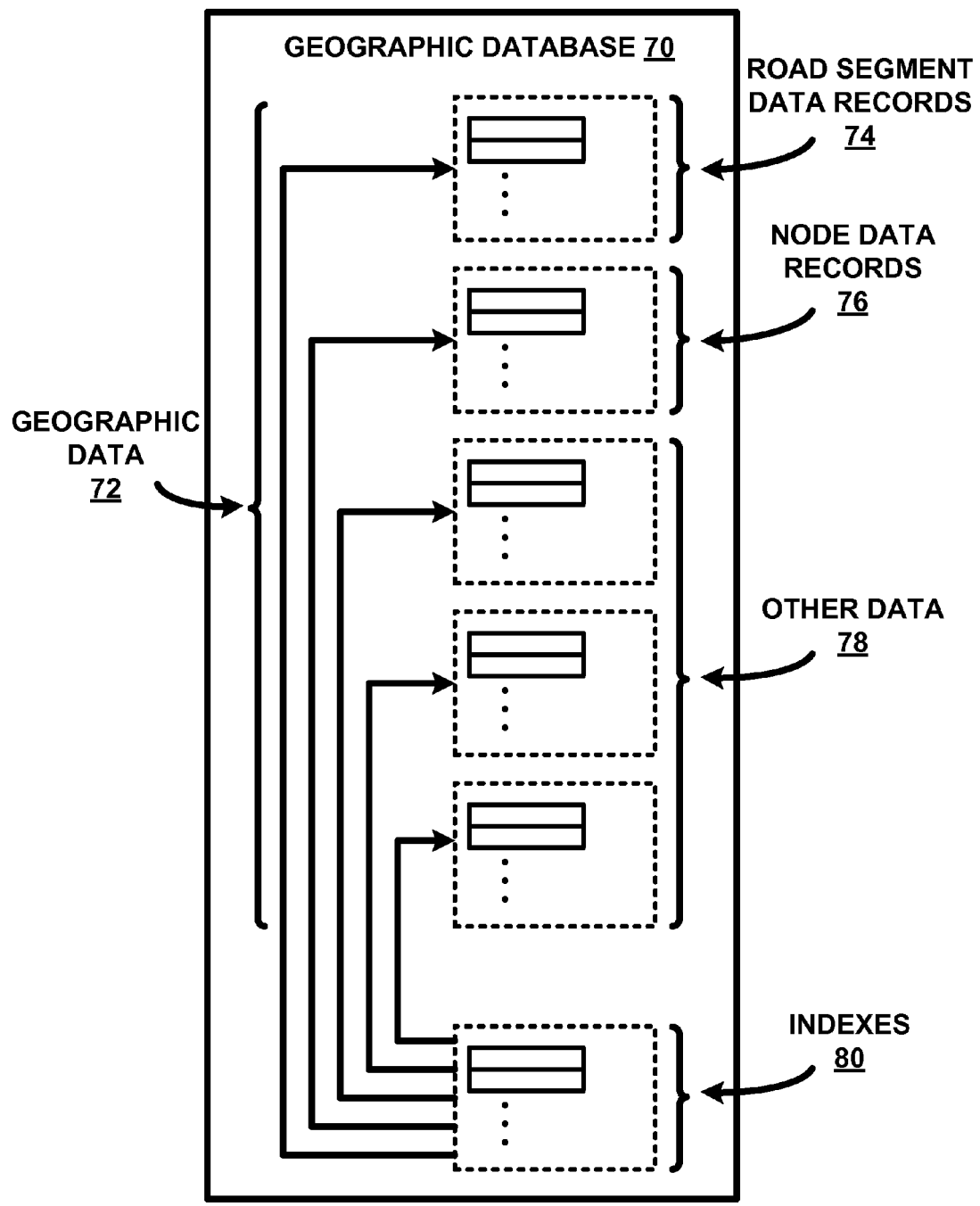
FIG. 4 is a block diagram of a geographic database that represents the geographic region of FIG. 3, according to an example.

Referring to FIG. 4, a geographic database 70 contains data 72 that represents some of the physical geographic features in the geographic region (52 in FIG. 3). The geographic database 70 may constitute all or part of the geographic database 26. For example, the geographic database 70 may be a subset of the data contained within the geographic database 26. The geographic database 70 may be accessible through the navigation system 10 and the computing platform 12. Alternatively or additionally, the geographic database 70 may be a standalone database located remotely from the geographic database 26, the navigation system 10, and/or the computing platform 12 but nonetheless accessible via the communication system 30 and/or the processor 14.

The data 72 contained in the geographic database 70 includes data that represent the road network 58. In the embodiment of FIG. 4, the geographic database 70 that represents the geographic region 52 contains at least one database record 74 (also referred to as "entity" or "entry") for each road segment 60 in the geographic region 52 in FIG. 3. The road segment data record 74 may include a segment ID by which the data record can be identified in the geographic database 70.

Each road segment data record 74 has associated with it information (such as "attributes", "fields", etc.) that describes features of the represented road segment. The road segment data record 74 may include data that indicate the restrictions, if any, on the direction of vehicular travel permitted on the represented road segment, data indicating a speed limit or speed category (i.e., the maximum permitted vehicular speed of travel) on the represented road segment, data indicating whether the represented road segment is part of a controlled access road (such as an expressway), a ramp to a controlled access road, a bridge, a tunnel, a toll road, a ferry, and so on.

The road segment data record 74 also includes data providing the geographic coordinates (e.g., the latitude and longitude) of the endpoints of the represented road segment and data providing the shape of the road segment. In one embodiment, the endpoint data are references to the node data records 76 that represent the nodes corresponding to the endpoints of the represented road segment.

The road segment data record 74 may also include or be associated with other data that refer to various other attributes of the represented road segment. The various attributes associated with a road segment may be included in a single road segment record, or may be included in more than one type of record that are cross-referenced to each other. For example, the road segment data record 74 may include data identifying what turn restrictions exist at each of the nodes that correspond to intersections at the ends of the road portion represented by the road segment, the name or names by which the represented road segment is known, the street address ranges along the represented road segment, and so on.

The geographic database 70 that represents the geographic region 52 also includes a database record 76 (or "entity" or "entry") for each node 62 in the geographic region 52. (The terms "nodes" and "segments" represent only one terminology for describing these physical geographic features and other terminology for describing these features is intended to be encompassed within the scope of these concepts). Each of the node data records 76 may have associated information (such as "attributes", "fields", etc.) that allows identification of the road segment(s) that connect to it and/or its geographic position (e.g., its latitude and longitude coordinates).

The geographic database 70 may also include other kinds of data 78. The other kinds of data 78 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. Each point of interest has a unique physical location and each of the locations can be identified by its two dimensional (or three dimensional) geographic coordinates, (i.e., latitude, longitude, and optionally altitude). Additionally, the locations may correspond to one of the nodes or may correspond to a point along a road segment.

The geographic database 70 also includes indexes 80. The indexes 80 may include various types of indexes that relate the different types of data to each other or that relate to other aspects of the data contained in the geographic database 70. One of the indexes is an index that is described with respect to FIGS. 5-11.

III. Location Based Full Text Search System

A. Overview

Figures 5, 6:
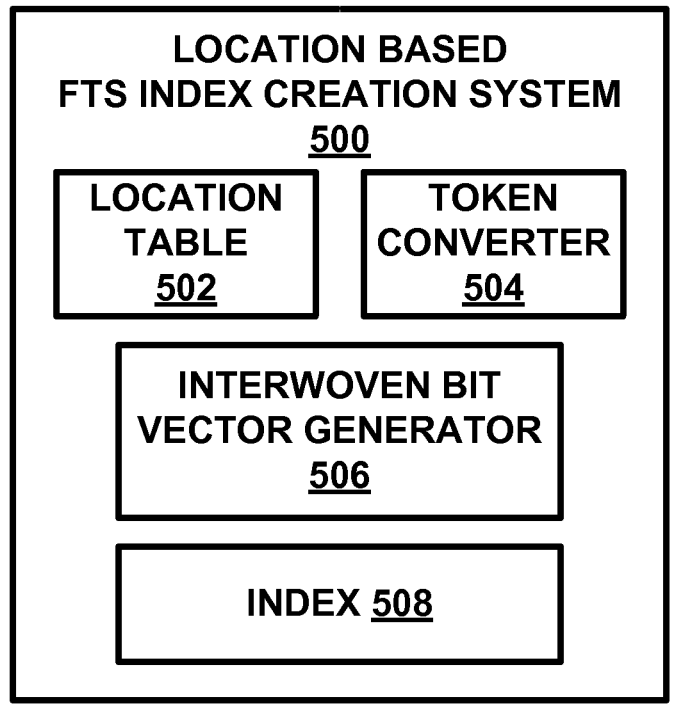
FIG. 5 is a block diagram of a location based full text search system, according to an example.
FIG. 6 depicts a one-dimensional value generated from a two-dimensional value, according to an example.

FIG. 5 is a block diagram of a location based full text search (LBFTS) index creation system 500. The LBFTS index creation system 500 may be embodied as program instructions stored on a non-transitory computer-readable medium (CRM), which when executed by a processor cause the processor to carry out function as described further herein. The LBFTS index creation system 500 may be embodied as a processor coupled to memory storage. The memory storage may have stored thereon program instructions, which, when executed by the processor, cause the LBFTS system 400 to carry out functions as described herein. Any such program instructions may be written in a suitable computer programming language such as C, C++, Java, or any other suitable program language now known or later developed. In the navigation system example, the LBFTS index creation system 500 may be part of or accessible to the compiler 46.

The LBFTS index creation system 500 is shown in FIG. 5 as including a location table 502, a token converter 504, an interwoven bit vector generator 506, and an index 508. The interwoven bit vector generator 506 generates interwoven bit vectors based on an input from the location table 502 and the token converter 504. The index 508 associates document identifiers with interwoven bit vectors generated by the interwoven bit vector generator 506. For example, the index 508 may be a one-dimensional index, such as a B-Tree.

B. Location Table

While the location table 502 is shown in FIG. 5 as part of the LBFTS index creation system 500, the location table 500 may also be included in the geographic database 26 or another location accessible by the LBFTS index creation system 500. The location table 502 associates locations, such as points of interest, with a location value, such as a Morton code. A Morton code (sometimes referred to as a z-order curve) is a space-filling curve that enables a multi-dimensional value (such as a latitude/longitude value) to be expressed as a one-dimensional integer value. Using a one-dimensional integer value to represent a point of interest's location may allow the index 508 to be a one-dimensional index structure, such as a B-Tree, which may be more efficient than multi-dimensional index structures, such as R-Trees.

A Morton code is generated by interweaving bits of multi-dimensional values. FIG. 6 illustrates an example in which a two-dimensional value is converted to a one-dimensional Morton code. The two-dimensional value (45, 87) is first converted to binary. The value 45 is converted to 0100 0101 and the value 87 is converted to 1000 0111. Next, the two binary values are interwoven together, starting with the first binary value, to form the one-dimensional interwoven bit vector 01100000 00110111. As a visual aid, the first binary value is underlined so its bits can be identified in the interwoven bit vector. Finally, the interwoven bit vector is converted to decimal as 6037.

The example two-dimensional values depicted in FIG. 6 are comprised of two values, each one byte in length. Therefore, the Morton code generated from these two one-byte values is two-bytes in length. A point of interest may be associated with a two-dimensional value comprised of a latitude value and a longitude value. Depending on the implementation, the latitude and longitude values may be four bytes each, which would yield an eight-byte Morton code. Of course, other value lengths are also possible.

The location table 502 may be a relational table having the form: POIs(PoiID INTEGER, MortonCode INTEGER, Category INTEGER). A query for all points of interest that are located within a certain region may be formatted as follows.

SELECT * FROM POIs WHERE MortonCode BETWEEN X AND Y, where X and Y are integers. A regional box query may be accomplished through a single range query (like the query above) or a sequence of ranges. This example and other examples provided herein use SQLite syntax. However, depending on the implementation, other suitable commands and data structures may be used as well.

In addition to associating points of interest with Morton codes, map tiles may also be associated with Morton codes. In this example, the location table 502 may have the form: Tiles(TileID INTEGER, TileData BLOB) where TileID is equal to the Morton code of the tile. A query for a range of tiles may be formatted as follows.

SELECT * FROM TileID WHERE TileID BETWEEN X AND Y,
where X and Y are integers.

A map of a geographic region may be divided by overlaying a grid on the map. The grid is formed of grid lines that divide the represented geographic region into a plurality of areas or map tiles. The lines of the grid represent the boundaries of the map tiles. Typically, the map tiles are rectangular; however, the map tiles may have other shapes. The map tiles may all have the same dimensions; however, other dimensions may be used.

A grouping of data corresponding to a map tile contains a plurality of individual data records that represent the geographic features that are encompassed within the map tile area. Thus, each separate grouping of data contains the data records that represent the geographic features, such as the roads, intersections, points of interest, and other features, encompassed within a corresponding map tile area.

Map tiles that depict a relatively small geographic area typically have larger Morton codes than map tiles that depict a relatively large geographic area. A map tile that depicts a small geographic area may referred to as "zoomed-in," whereas a map tile that depicts a large geographic area may be referred to as "zoomed-out."

C. Index Creation

In the navigation system example, index creation may occur during the compilation process of generating geographic database products as shown in FIG. 2. In other examples, the index may be created and stored on any computing platform prior to operation (i.e., querying) of the LBFTS system.

In practice, a user of the navigation system 10 may desire to view a specific map tile and search for all points of interest within that map tile that match one or more entered search tokens. For each point of interest (or other database entry), the LBFTS index creation system 500 generates an interwoven bit vector that is a combination of the point of interest's Morton code (location value) and at least one data value associated with the search tokens.

Figure 7:
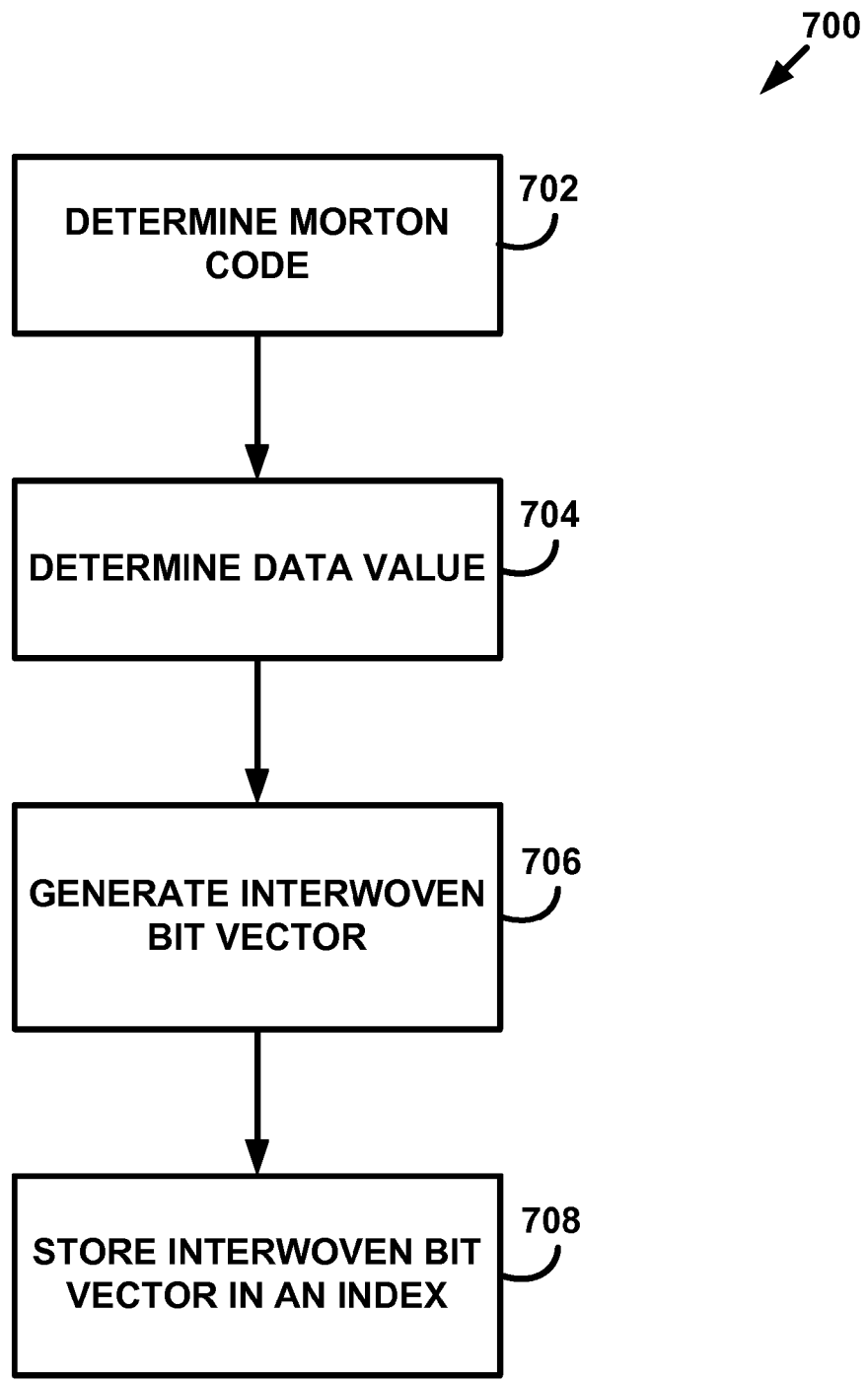
FIG. 7 is a flow diagram of a method of generating an index for a location based full text search system, according to an example.

FIG. 7 is a flow diagram of a method 700 for creating the index 508. At block 702, the LBFTS index creation system 500 determines a Morton code for a point of interest. The Morton codes may be stored in the location table 502 having the form: POIs(PoiID INTEGER, MortonCode INTEGER, Category INTEGER). Thus, for a particular point of interest, the interwoven bit vector generator 506 uses the point of interest's identifier (PoiID) to retrieve the Morton code associated with the point of interest from the location table 502. By way of example, FIG. 8 depicts a Morton code associated with the point of interest having the identifier POI1.

In other embodiments, the Morton codes may not be stored in the location table 502. In this example, the LBFTS index creation system 500 may generate a Morton code for a particular point of interest based on the latitude and longitude values associated with the point of interest. The LBFTS index creation system 500 may retrieve the latitude and longitude values from the location table 502, the geographic database 26, or another location accessible to the LBFTS index creation system 500. The LBFTS index creation system 500 may then store the generated Morton code in the location table 502.

Referring back to FIG. 8, the LBFTS index creation system 500 obtains a 32-bit (4-byte) latitude value for POI1 of:
11101100 10101101 11000100 01100111.
Likewise, LBFTS index creation system 500 obtains a 32-bit (4-byte) longitude value for POI1 of:
11100011 01111010 11000101 11001000.
The latitude value shown in FIG. 8 is underlined as a visual aid. Based on the latitude and longitude values, the LBFTS index creation system 500 generates a Morton code by interweaving single bits of the latitude value with single bits of the longitude value, starting with the latitude value. The generated 64-bit (8-byte) Morton code becomes:
11111100 10100101 10011101 11100110
11110000 00110001 01111000 01101010.

The method described above is merely an example and other methods exist for generating a Morton code based on latitude and longitude values. For instance, the LBFTS index creation system 500 may start with a bit from the longitude value instead of the latitude value. Further, the LBFTS index creation system 500 could interweave two (or more) bits of the latitude value with two (or more) bits of the longitude value. And still further, the LBFTS index creation system 500 may interweave or combine the latitude value with the longitude value according to any number of other suitable ways.

At block 704, the LBFTS index creation system 500 receives a data token associated with the point of interest. Referring back to FIG. 8, the LBFTS index creation system 500 receives the data token "NAVTEQ." The token converter 504 converts the data token into a binary value (referred to herein as a "data value"). In some embodiments, it may be preferable for the bit-length of the data value to be equal to the bit-length of the Morton code. In the example depicted in FIG. 8, the length of the Morton code is eight bytes but other lengths are possible as well.

Therefore, at block 704, the token converter 504 may determine whether the length of the data value is smaller than the length of the Morton code, equal to the length of the Morton code, or greater than the length of the Morton code. If the data value is smaller than the length of the Morton code, the token converter 504 may append one or more zero-bytes to the data value until the length of the data value is equal to the length of the Morton code. If the data token has the same length as the Morton code, then the token converter 504 may append nothing to the data value. And if the data value is larger than the Morton code, the token converter 504 may append one or more zero-bytes to the Morton code until the lengths are equal.

In the example depicted in FIG. 8, the data token "NAVTEQ" is six characters in length and, therefore, represented by a data value of six bytes. Thus, the token converter 504 may append two zero-bytes to the end of the six-byte data value in order for length of the data value to equal the length of the Morton code. The eight-byte data value becomes:
01001110 01000001 01010110 01010100
01000101 01010001 00000000 00000000.
The eight-byte data value shown in FIG. 8 is double underlined as a visual aid.

At block 706, the interwoven bit vector generator 506 generates an interwoven bit vector using the Morton code from the location table 502 and the data value from the token convertor 504. An interwoven bit vector may be generated by interweaving a fixed number of bits of the data value with a fixed number of bits of the Morton code. This fixed number may be referred to as an "offset number" and stored in metadata of the index 508.

The offset number is typically one, two, or three (although it could be any suitable number). According to the example depicted in FIG. 8, the offset number is two. Thus, the interwoven bit vector is generated by interweaving two bits of the Morton code with two bits of the data token value until all the bits from both values are used. The example interwoven bit vector becomes:
11011100 11110010 10011000 01000101
10010101 11010110 11011001 01011000
11011100 00010001 00011101 00000101
01001100 10000000 01001000 01001000.

Other suitable ways of generating interwoven bit vectors exist as well, such as interweaving differing numbers of bits from each value.

At block 708, the interwoven bit vector generator 506 stores the interwoven bit vector in the index 508. The index 508 may be a relation table having the following form.
FtsAndSpatialIndex(InterwovenData BLOB, PoiID INTEGER)
Each interwoven bit vector may occupy a separate record in the table.

For example, the LBFTS index creation system 500 may carry out the method 700 for each data token associated with a point of interest. For example, there may be eight data tokens associated with POI1 (e.g., "NAVTEQ," "Otto," "Volger," "Strasse," "1," "65843," "Sulzbach," and "Deutschland"). Thus, there would be eight records in FtsAndSpatialIndex associated with POI1. Each column in FtsAndSpatialIndex may be a primary key. In addition, the index 508 may utilize a B-Tree or other suitable one-dimensional index on the InterwovenData column.

D. Query Processing

Figure 9:
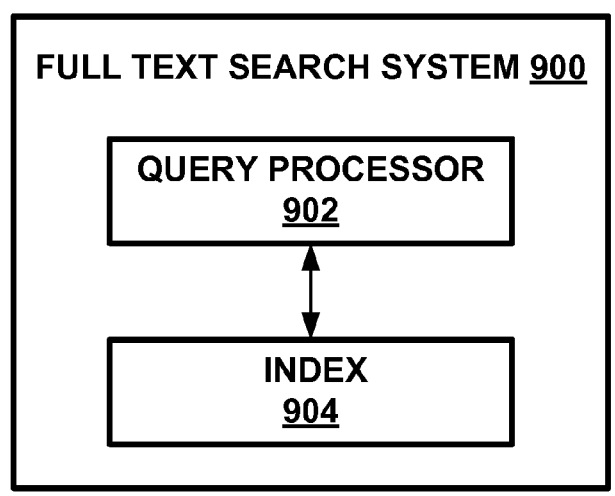
FIG. 9 is a block diagram of a location based full text search system, according to another example.

FIG. 9 is a block diagram of a location based full text search (LBFTS) system 900. The LBFTS system 900 includes a query processor 902 and an index 904. The index 904 may be a copy of the index 508 generated using the method 700. As previously described, in the navigation system example, the index 904 may be included in the indexes 80.

The query processor 902 may be embodied as program instructions stored on a non-transitory computer-readable medium, which when executed by a processor cause the processor to carry out function as described further herein. Any such program instructions may be written in a suitable computer programming language such as C, C++, Java, or any other suitable program language now known or later developed.

In the navigation system example, the query processor 902 may be part of the navigation programs 20 contained within the non-volatile memory 18 of the navigation system 10. For example, the query processor 902 may be used in the navigation system 10 as part of destination selection. In this example, some or all of the query processor 902 may be included as part of the destination selection program 32.

The LBFTS index creation system 500 and the LBFTS system 900 may be combined into a single LBFTS system. They are shown separately because some functions of the query processor 902 are not needed during index creation. Additionally, as described with the navigation system example, the components of the LBFTS index creation system 500, 900 do not need to be co-located as shown in FIGS. 5 and 9. The index 904 may be the same as the index 508 once the index creation process is completed.

Figure 10:
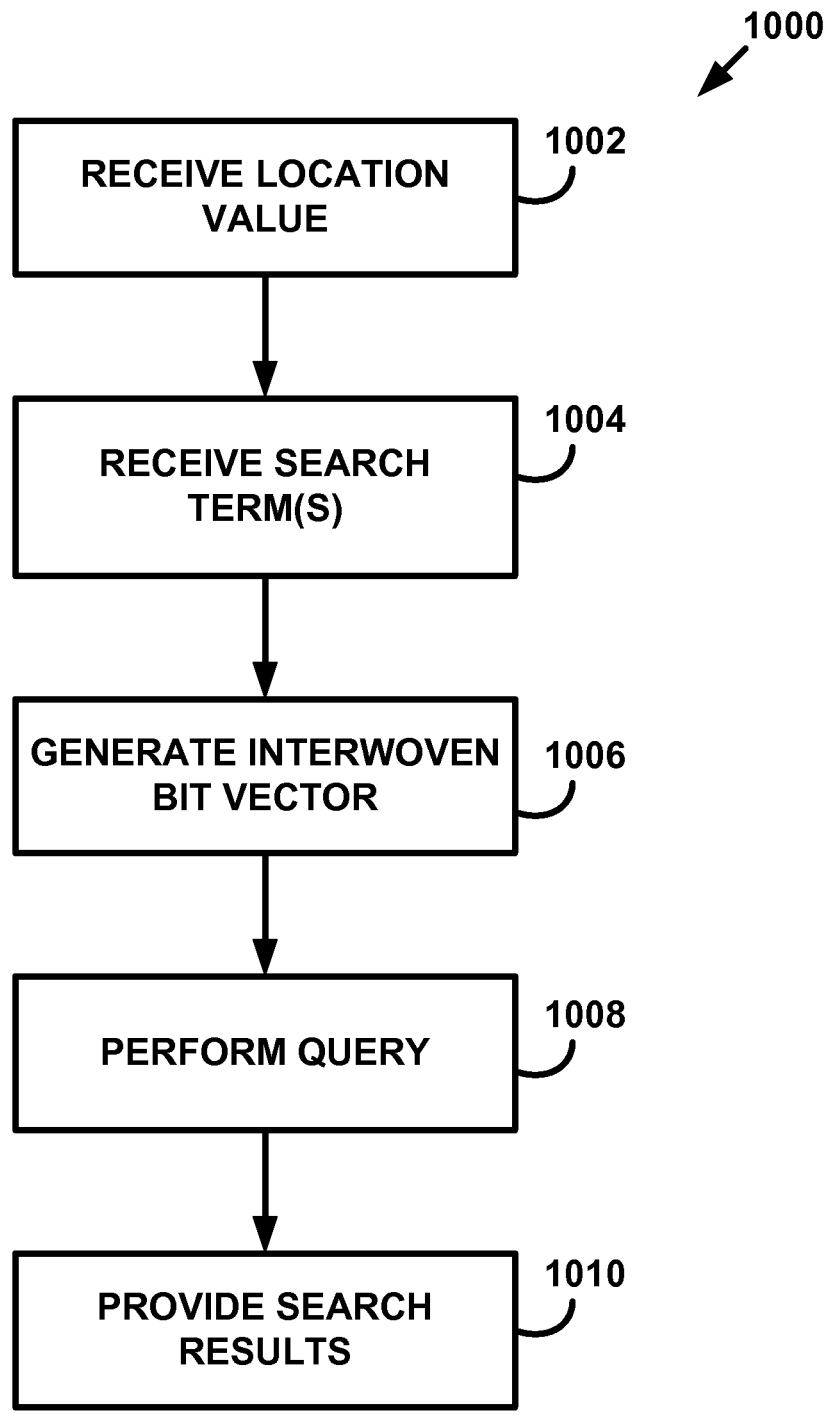
FIG. 10 is a flow diagram of a method of performing a location based full text search using the system depicted in FIG. 9, according to an example.

FIG. 10 is a block diagram of a method 1000 for facilitating a location based full text search. At block 1002, the LBFTS system 900 receives a location value from a user. For example, the user may be a user of navigation system 10. In at least one embodiment, a user may be viewing a particular map tile via the user interface 24 of navigation system 10. The LBFTS system 900 may receive from the navigation system 10 an indication of the tile ID associated with the map tile the user is viewing. The tile ID is a Morton code.

Alternatively, the LBFTS system 900 may receive a location value directly from the user. For instance, a user may enter via user interface 24 a latitude value and a longitude value. The LBFTS system 900 may receive the latitude and longitude values and generate a Morton code based on the received latitude and longitude value according to the process described above with respect to block 702 and FIG. 8 (or any other suitable process). Alternatively, the user may enter a Morton code directly and the LBFTS system 900 may receive the Morton code as the location value. The LBFTS system 900 may receive a location value in any number of other suitable ways as well including, for example, via the positioning system 22.

At block 1004, the LBFTS system 900 receives at least one search term from a user. The search term may be a word that relates to a desired destination or point of interest (e.g., street name, point of interest name, category, or part of an address). The user may enter the search term via the user interface 24 or in any other suitable way.

At block 1006, the query processor 902 generates an interwoven bit vector for each received search term in block 1004. The interwoven bit vector for a given search term is based on the given search term and the received location value (e.g., Morton code) from block 1002. According to the example depicted in FIG. 11A, the LBFTS system 900 receives or determines a Morton code as:

11111100 10100101 10011101
(underlined in FIG. 11A as a visual aid).

The Morton code depicted in FIG. 11A is three bytes in length. However, Morton code lengths may be shorter or longer in practice depending on the particular map tile a user is viewing and/or depending on the set of latitude and longitude coordinates the LBFTS system 900 may have otherwise determined.

The LBFTS system 900 may receive "NAV" as a search term at block 1004. In response to receiving the search term, the query processor 902 may convert the search term to binary. In the example depicted in FIG. 11A, "NAV" becomes:

01001110 01000001 01010110.

At block 1006, the query processor 902 may then generate an interwoven bit vector according to the process previously described with respect to method 700 and FIG. 8. For instance, the query processor 902 may determine the offset value from metadata in the index 904, which is two in this example. Thus, the query processor 902 may generate the interwoven bit vector by interweaving two bits from the data value with two bits of the Morton code until all bits from each value have been used. The interwoven bit vector becomes:

1101110011110010 1001100001000101 1001010111010110.

At block 1008, the query processor 902 performs a query using at least part of the generated interwoven bit vector. To facilitate the query, the query processor 902 may generate an upper-bound bit vector and a lower-bound bit vector. In accordance with the example depicted in FIG. 11A, the query processor 902 may generate an upper-bound bit vector by appending one-bytes to the end of the interwoven bit vector until the upper-bound bit vector is a predetermined length. The predetermined length depicted in FIG. 11A is sixteen bytes; however, other suitable predetermined lengths are possible as well. Similarly, the query processor 902 may generate a lower-bound bit vector by appending zero-bytes to the interwoven bit vector until the lower-bound bit vector is the predetermined length.

Upon generating the upper-bound and lower-bound bit vectors, the query processor 902 may issue a range query as follows.

---

SELECT PoiID FROM FtsAndSpatialIndex WHERE InterwovenData >=
1101110011110010 1001100001000101 1001010111010110
0000000000000000 0000000000000000 0000000000000000
0000000000000000 0000000000000000
AND InterwovenData <=
1101110011110010 1001100001000101 1001010111010110
1111111111111111 1111111111111111 1111111111111111
1111111111111111 1111111111111111

---

At block 1010, the query processor 902 provides the result set of document identifiers or other data associated with the queried interwoven bit vector. The document identifiers are associated with documents. The term document means any kind of electronic data record or file that contains text. In the example of a navigation system, relevant documents may be a segment, node, point of interest, or other record stored in the geographic database 26.

The query processor 902 may provide the result set to another system, which then retrieves the documents and provides the documents to the user. Alternatively, the query processor 902 may retrieve the documents associated with the document identifier and then provide the documents to the user.

For instance, in response to the above query, the query processor 902 may identify POI1 because POI1 has associated with it the interwoven bit vector:

1101110011110010 1001100001000101 1001010111010110
1101100101011000 1101110000010001 0001110100000101
0100110010000000 0100100010001000.

The query processor 902 may provide the point of interest identifier, POI1, to the map display application 38, which then retrieves data from the geographic database 26 associated with POI1. The map display application 38 may then display a map that identifies a location and possibly other data associated with POI1 on the user interface 24.

E. Additional Examples

Several other queries are possible depending on the length and number of search terms a user enters. According to the example depicted in FIG. 11B, the LBFTS system 900 may receive or otherwise determine a Morton code as:

11111100 10100101 10011101.

A user may enter "NA" as a search term.

Upon receiving the search term, the LBFTS system 900 may make a determination that the received search term has a shorter data value length than the Morton code. In the example depicted in FIG. 11B, the data value is two bytes whereas the Morton code is three bytes. In response to making this determination, the LBFTS system 900 may append at least one zero-byte to the data value so that the data value's length is equal to the Morton code's length. The binary value of "NA" with an appended zero-byte is:

01001110 01000001 00000000.

The LBFTS system 900 may then generate an interwoven bit vector in accordance with the interweaving process previously described and produce the interwoven bit vector:

1101110011110010 1001100001000101 1000010011000100.

To facilitate a query, the LBFTS system 900 may then generate an upper-bound bit vector and a lower-bound bit vector. The lower-bound bit vector may be generated in accordance with the process previously described with respect to FIG. 11A and is as follows:

1101110011110010 1001100001000101 1000010011000100
0000000000000000 0000000000000000
0000000000000000 0000000000000000.

However, when a zero-byte is appended to the data value because the search term is shorter than the Morton code, the upper-bound bit vector is generated as if a one-byte was appended to the data value instead of a zero-byte. In FIG. 11B, the bits of the upper-bound bit vector that are marked with a double underline are the bits that have been changed from zero to one. This change may facilitate more accurate querying.

Finally, after the upper-bound and lower-bound bit vectors are generated, the LBFTS system 900 may issue a range query as follows.

---
SELECT PoiID FROM FtsAndSpatialIndex WHERE InterwovenData >=
1101110011110010 1001100001000101 1000010011000100
0000000000000000 0000000000000000 0000000000000000
0000000000000000 0000000000000000
AND InterwovenData <=
1101110011110010 1001100001000101 1011011111110111
1111111111111111 1111111111111111 1111111111111111
1111111111111111 1111111111111111.

---

According to the example depicted in FIG. 11C, the LBFTS system 900 may receive or otherwise determine a Morton code as:

11111100 10100101 10011101.

A user may enter "NAVTEQ" as a search term. Upon receiving the search term, the LBFTS system 900 may make a determination that the received search term has a data value having a longer length than the received Morton code. In the example depicted in FIG. 11C, the data value is six bytes whereas the Morton code is three bytes. In response to making this determination, the LBFTS system 900 may append at least one zero-byte to the Morton code so that the length of the Morton code and the length of the data value are equal. The binary form of "NAVTEQ" is:

01001110 01000001 01010110
01010100 01000101 01010001.

And the Morton code with three appended zero-bytes becomes:

11111100 10100101 10011101
00000000 00000000 00000000.

The LBFTS system 900 may then generate an interwoven bit vector in accordance with the interweaving process previously described and produce the interwoven token:

1101110011110010 1001100001000101 1001010111010110
0001000100010000 0001000000010001 0001000100000001.

To facilitate a query, the LBFTS system 900 may then generate an upper-bound bit vector and a lower-bound bit vector. The lower-bound bit vector may be generated in accordance with the process previously described with respect to FIGS. 11A and 11B and is as follows:

1101110011110010 1001100001000101 1001010111010110
0001000100010000 0001000000010001 0001000100000001
0000000000000000 0000000000000000.

However, when one or more zero-bytes are appended to the Morton code because the data value is longer than the Morton code, the upper-bound bit vector is generated as if one or more one-bytes were appended to the Morton code instead of one or more zero-bytes. In FIG. 11C, the bits in the upper-bound bit vector that are marked with a double underline are the bits that have been changed from zero to one. As described above, this change may facilitate more accurate querying.

Finally, after the upper-bound and lower-bound bit vectors are generated, the LBFTS system 900 may issue a range query as follows.

---
SELECT PoiID FROM FtsAndSpatialIndex WHERE InterwovenData >=
1101110011110010 1001100001000101 1001010111010110
0001000100010000 0001000000010001 0001000100000001
0000000000000000 0000000000000000
AND InterwovenData <=
1101110011110010 1001100001000101 1001010111010110
1101110111011100 1101110011011101 1101110111001101
1111111111111111 1111111111111111

---

According to another example, if the LBFTS system 900 receives two (or more) search terms at block 1004, the LBFTS system 900 may generate two (or more) interwoven bit vectors, two (or more) sets of upper-bound and lower-bound bit vectors, and issue an intersect query. For example, if the LBFTS system 900 receives at block 1004 "NAV" and "SULZBACH," the LBFTS system 900 may at block 1008 issue a query as follows:

---
SELECT PoiID FROM FtsAndSpatialIndex WHERE InterwovenData >=
1101110011110010 1001100001000101 1001010111010110
0000000000000000000000000000000000000000000000000
0000000000000000 0000000000000000
AND InterwovenData <=
1101110011110010 1001100001000101 1001010111010110
1111111111111111 1111111111111111 1111111111111111
1111111111111111 1111111111111111.
INTERSECT
SELECT PoiID FROM FtsAndSpatialIndex WHERE InterwovenData >=
1101110111000011 1001100101010101 1001010011110100
0001000100010010
0001000000000010 0001000000000001 0001000000000011
0001000000100000
AND InterwovenData <=
1101110111000011 1001100101010101 1001010011110100
1101110111101110
1101110011001110 1101110011001101 1101110011001111
1101110011101100.

---

IV. Alternative Embodiments

One more of the following alternative embodiments may be used in place of or in combination with any of the above-disclosed embodiments as well as any of the hereinafter-described alternative embodiments as appropriate.

A. Hexadecimal Values

The LBFTS index creation system 500 may utilize hexadecimal or other numeral system instead of binary. For example, with respect to method 700 at block 702, the LBFTS index creation system 500 may determine the Morton code associated with POI1 and convert it to hexadecimal. The hexadecimal value for the Morton code associated with POI1 is "FCA5 9DE6 F031 786A."

The LBFTS index creation system 500 may determine a data value associated with POI1 in accordance with the process previously described with respect to block 704. Instead of converting the data token to binary, the LBFTS index creation system 500 may instead proceed to block 706 and generate an interwoven bit vector by interweaving characters of the data token with the hexadecimal Morton code. In one embodiment, the LBFTS index creation system 500 may interweave two characters of the Morton code with one character of the data token to yield: "FCNA5A9DVE9TF0E31Q7806A0." In other embodiments, however, the LBFTS index creation system 500 may interweave characters from the Morton code and characters from the data token according to other suitable ways.

The LBFTS index creation system 500 may store the interwoven bit vector in a relational table according to the process previously described with respect to block 708. Alternatively, the LBFTS index creation system 500 may store the interwoven token in a standard FTS3 table of the form VT_POI (PoiID INTEGER, Data BLOB, InterwovenStrings BLOB). The column InterwovenStrings contains the interwoven strings generated from the Morton code and the data tokens associated with the same POI. For example, the InterwovenStrings column for POI1 would contain eight interwoven strings. FTS3 is the term for the SQLite Full Text Search engine and is provided as an example only. Other full text search systems, such as Lucene and SQL, may also be used.

The LBFTS system 900 may process a query in a similar way. For instance, at block 1002, the LBFTS system 900 may determine the Morton code of a particular map tile as "FCA59DE6." At block 1004, the LBFTS system 900 may receive a search token "NAVTEQ." At block 1006, the LBFTS system 900 may generate an interwoven token based on the Morton code and the received search term. An interwoven token based on "FCA59DE6" and "NAVTEQ" may be "FCNA5A9DVE9T." However, other suitable ways of generating interwoven tokens exist and may be used as well. Finally, at block 1008, the LBFTS system 900 may issue a query using the generated interwoven bit vector as follows.

SELECT * FROM VT_POI WHERE VT_POI match "InterwovenStrings:

"FCNA5A9DVE9T *" AND DATA like '%NAVTEQ%'

In this query, the interwoven string is used as a rough filter. The resulting candidate set is then be refined by the SQL like clause.

B. Efficient Storage of Interwoven Data

The generation and storage of interwoven bit vectors for each POI may contribute to an increased data size, which may have several negative consequences including added cost and processing time. In order to minimize the size increase, the LBFTS index creation system 500 may facilitate the storage of shortened interwoven bit vectors.

For example, a table of the form FtsAndSpatialBlobIndex (InterwovenDataPrefix BLOB, ListOfInterwovenDataSuffixAndIDs BLOB) may store the starting prefix of an interwoven bit vector in the InterwovenDataPrefix column. The POI IDs and all interwoven bit vectors that share the same prefix may be stored in the same record in the column ListOfInterwovenDataSuffixAndIDs with only the data that comes after the shared prefix. The LBFTS index creation system 500 may store the size of the prefix in the metadata of the index 508.

One example prefix size is 48 bits. Thus, if five interwoven bit vectors are each 128 bits in length and have identical first 48 bits, then the identical string of 48 bits may be stored in the InterwovenDataPrefix column. The remaining 80 bits of each of the five interwoven bit vectors may be stored in the ListOfInterwovenDataSuffixAndIDs column. Those skilled in the art will understand that this is merely an example and other prefix sizes may be used as well including, for example, 12, 16, 24, 32, 56, and so on. In this scenario, only the prefix is stored in the index 508.

C. Proprietary Database Structures

In addition to storing interwoven bit vectors in relations indexed by B-Trees, those skilled in the art will understand that interwoven bit vectors may be stored in any proprietary database structure or proprietary file structure. The database or file structure may not be based on SQL but, instead, on any suitable proprietary algorithm in accordance with the entirety of the present disclosure.

D. Generalized Spatial Search

The Morton code (or other location value) received at block 1002 may be based on a single map tile. However, sometimes a user of the navigation system 10 may be viewing a combination of map tiles. For example, half of a user's screen may be showing part of a level 12 map tile, whereas the other half may be showing part of a level 13 map tile. Other examples of map tile combinations are possible as well.

When a user is viewing multiple map tiles, the LBFTS system 900 may determine the Morton code of each of the map tiles represented on the user's screen and generate separate interwoven bit vectors for each of the determined Morton codes. Each of the generated interwoven bit vectors is based on a received search term and one of the Morton codes. Subsequently, the LBFTS system 900 may carry out separate queries using the interwoven bit vectors and combine the list of results for the user.

V. Conclusions

The LBFTS systems 500, 900 and the methods 700, 1000 may increase query processing speed. As a result, the LBFTS systems 500, 900 and the methods 700, 1000 may be beneficial during destination selection with a navigation system. However, based on this disclosure, those skilled in the art will realize that the LBFTS systems 500,900 and the methods 700, 1000 may be used in navigation systems for other location based full text search applications and in other systems that perform location based full text searches.

It is intended that the foregoing detailed description be regarded as illustrative rather than limiting and that it is understood that the following claims including all equivalents are intended to define the scope of the invention. For example, while many of the examples used points of interest documents, other documents may be searched using the system and methods described herein. The claims should not be read as limited to the described order or elements unless stated to that effect. Therefore, all embodiments that come within the scope and spirit of the following claims and equivalents thereto are claimed as the invention.

I claim:

1. A method comprising:
receiving data indicative of a location;
receiving a search term;
identifying a first geographical coordinate and a second geographical coordinate corresponding to the location;
combining, using a processor, the first geographical coordinate and the second geographical coordinate into a single dimensional location value; and
combining, using the processor, the single dimensional location value and the search term into a vector.

2. The method of claim 1, further comprising:
querying a geographic database with the vector.

3. The method of claim 2, further comprising:
receiving search results limited spatially by a geographic area based on the location and limited textually by the search term.

4. The method of claim 1, further comprising:
performing range query based on the vector.

5. The method of claim 1, wherein the vector includes alternating portions of the first geographical coordinate, the second geographical coordinate, and the search term.

6. The method of claim 1, wherein a length of the alternating portions is defined by an offset value, wherein the offset value is defined by a geographic database.

7. The method of claim 1, further comprising:
modifying a character length of at least one of the first geographical coordinate, the second geographical coordinate, and the search term so that the first geographical coordinate, the second geographical coordinate, and the search term have the same length.

8. The method of claim 1, further comprising:
converting the first geographical coordinate to a numbering system;
converting the second geographical coordinate to the numbering system; or converting the search term to the number system.

9. The method of claim 8, wherein the numbering system is binary or hexadecimal.

10. The method of claim 1, further comprising:
identifying a map tile viewed on a device; and
selecting the data indicative of the location based on the map tile.

11. The method of claim 1, further comprising:
detecting a geographic position of a device; and
selecting the data indicative of the location based on the geographic position of the device.

12. An apparatus comprising:
at least one processor; and
at least one memory including computer program code for one or more programs, the at least one memory and the computer program code configured to, with the at least one processor, cause the apparatus to perform at least the following:
identify a first geographical coordinate and a second geographical coordinate corresponding to a location;
combine the first geographical coordinate and the second geographical coordinate into a single dimensional location value; and
combine the single dimensional location value and a search term for a point of interest into a vector.

13. The apparatus of claim 12, wherein the at least one memory and the computer program code configured to, with the at least one processor, cause the apparatus to:
query a geographic database with the vector.

14. The apparatus of claim 13, further comprising:
receive search results limited spatially by a geographic area based on the location and limited textually by the search term.

15. The apparatus of claim 12, wherein the vector includes alternating portions of the first geographical coordinate, the second geographical coordinate, and the search term.

16. The apparatus of claim 12, wherein the at least one memory and the computer program code configured to, with the at least one processor, cause the apparatus to:
modify a character length of at least one of the first geographical coordinate, the second geographical coordinate, and the search term so that the first geographical coordinate, the second geographical coordinate, and the search term have the same length.

17. The apparatus of claim 12, wherein the first geographical coordinate and the second geographical coordinate are based on a geographic position of a device or a map area viewed on the device.

18. An apparatus comprising:
a geographic database; and
a processor configured to identify a first geographical coordinate and a second geographical coordinate corresponding to a location and combine the first geographical coordinate, the second geographical coordinate, and a search term into a single dimensional vector for querying the geographic database.

19. The apparatus of claim 18, wherein the geographic database is configured to return search results limited spatially by a geographic area based on the location and limited textually by the search term.

20. The apparatus of claim 18, wherein processor is configured to access an offset value for an index in the geographic database, wherein the vector includes alternating portions of the first geographical coordinate, the second geographical coordinate, and the search term defined at least in part by the offset value.

* * * * *